(No Model.)

A. V. DILLENBECK.
CAR BRAKE AND STARTER.

No. 370,935. Patented Oct. 4, 1887.

WITNESSES:
Donn Twitchell
C. Sedgwick

INVENTOR:
A. V. Dillenbeck
BY Munn & Co.
ATTORNEYS.

UNITED STATES PATENT OFFICE.

ARIE V. DILLENBECK, OF ROCHESTER, NEW YORK.

CAR BRAKE AND STARTER.

SPECIFICATION forming part of Letters Patent No. 370,935, dated October 4, 1887.

Application filed April 18, 1887. Serial No. 235,217. (No model.)

*To all whom it may concern:*

Be it known that I, ARIE V. DILLENBECK, of Rochester, in the county of Monroe and State of New York, have invented a new and Improved Car Brake and Starter, of which the following is a full, clear, and exact description.

This invention relates to car brakes and starters; and it consists, essentially, of a combination of elements, which combination of elements acts as a brake and stores the force employed in braking or stopping the car, so that said force may be utilized for the purpose of starting the car forward when required, as will be hereinafter described, and specifically pointed out in the claims.

Reference is to be had to the accompanying drawings, forming a part of this specification, in which similar figures of reference indicate corresponding parts in all the views.

Figure 1:
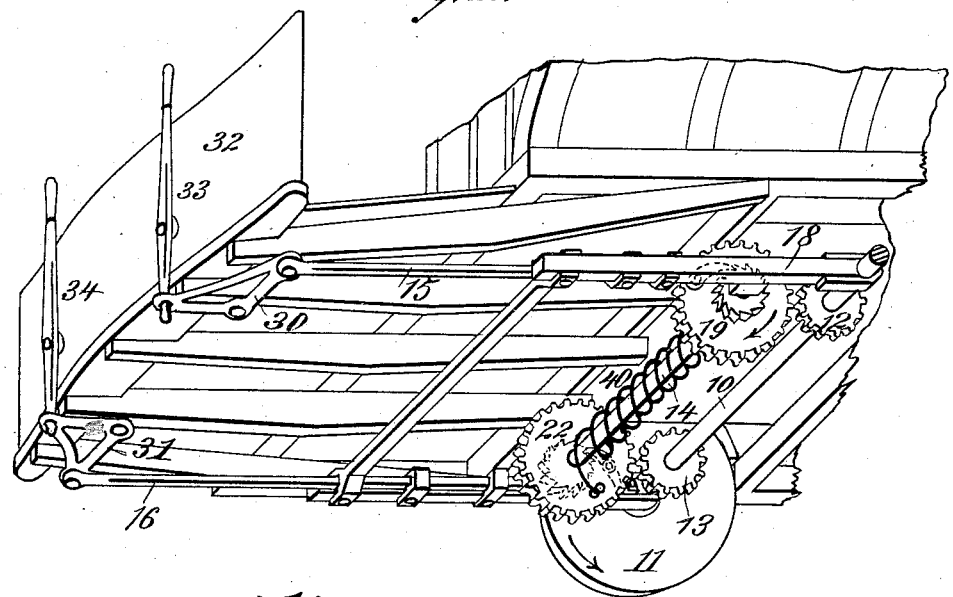
Figure 2:
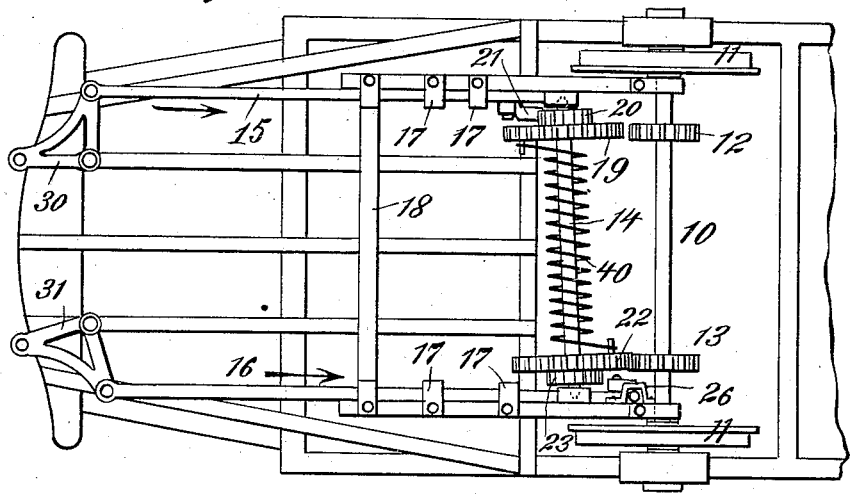
Figure 3:
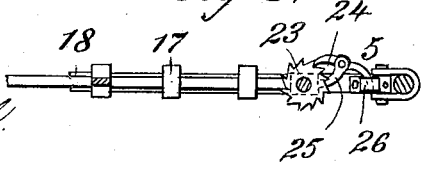

Figure 1 is a perspective view of a portion of the under side of a car provided with my improved braking and starting mechanism, the parts being represented as they appear when both the braking and the starting attachments are thrown out of gear. Fig. 2 is an inverted plan view of the car brake and starter, the parts being represented as they appear when the car-starting mechanism is in a position for operation; and Fig. 3 is a sectional detail view illustrating the construction of the ratchet and pawl employed in connection with the car-starting gear.

In the construction illustrated in the drawings above referred to, 10 represents one of the car-axles, to which there are, as usual, fixed wheels 11, and inside of these wheels I mount small gear-wheels 12 and 13.

In advance of the axle 10 I mount a shaft, 14, the bearings of which said shaft are carried by rods 15 and 16, that are supported by straps 17, said straps being carried by a frame, 18, the rods 15 and 16 being free to slide forward and back within the straps 17.

Upon the shaft 14 I mount a loose gear, 19, that is made integral with or rigidly connected to a ratchet, 20, a pawl, 21, that is carried by the rod 15, being arranged to engage with the ratchet 20. At the other end of the shaft 14 I loosely mount a second gear, 22, that is provided with a ratchet, 23, and this ratchet is arranged so that it will be engaged by a pawl, 24, that is mounted upon an arm, 25, carried by the rod 16, the end of this pawl 24 being arranged so that as the rod 16 is moved in the direction of the arrow shown in connection therewith in Fig. 2 it will enter a bracket, 26, that is carried by the frame 18 and be thrown from engagement with its ratchet 23. The purpose of this movement will be hereinafter explained.

The forward ends of the rods 15 and 16 are pivotally connected to bell-crank levers 30 and 31, respectively, which levers are mounted beneath the platform of the car.

To the dash-board of the car, which is shown at 32, I connect levers 33 and 34, the lower ends of the short arms of which engage with the levers 30 and 31, while the long arms of the levers extend above the dash-board, in order that they may be grasped by the driver or other attendant.

A spring, 40, is coiled about the shaft 14, one end of said spring being connected to the gear 19, while the other end of the spring is connected to the gear 22.

Such being the general arrangement of my improved car brake and starting mechanism, the operation is as follows: In ordinary travel the parts would be adjusted as represented in Fig. 1; but if it were desired to stop the car the lever 33 would be thrown in a direction so that the rod 15 would be carried in the direction of the arrow shown in connection therewith, which movement of the rod 15 would throw the gear 19 into engagement with the gear 12 of the axle 10, and as the two gears are so thrown into mesh the gear 19 will be moved in the direction of the arrow shown in Fig. 1, and, so moving, will wind up the spring 40, the tension of said spring at this time acting to check the momentum of the car, it being understood that the gear 22 is at this time held against all rotative movement by its pawl 24. As the momentum of the car is checked, the lever 33 is moved so as to disengage the gears 12 and 19, the pawl 21 at this time acting to hold the spring 40 under tension; but if it is desired to start the car the lever 34 is thrown so as to move the rod 16 backward, to carry the gear 22 to a position so that it will engage with the gear 13, and just as these two gears come into engagement the rearwardlyextending arm 5 of the pawl 24 will enter the recess of the bracket 26 and be thereby depressed, so that the engaging end of the pawl will be thrown out of engagement with the ratchet 23, thus permitting the spring 40 to act to turn the gear in a proper direction to start the car-wheels forward.

Having thus fully described my invention, I claim as new and desire to secure by Letters Patent—

1. In a car braking and starting mechanism, the combination, with a car-axle, of gears fixed thereto, a movable shaft carrying loosely-mounted gears, a spring coiled about the shaft and connected to said gears, a means for holding the gears against rotary movement, and a means for throwing either of the loosely-mounted gears into engagement with its registering axle-gear, substantially as described.

2. In a car braking and starting mechanism, the combination, with gears fixed to the car-axle, of a shaft mounted in advance of the car-axle, loose gears carried by said shaft and provided with ratchets, pawls arranged in connection with the ratchets, a tripping attachment arranged in connection with one of the pawls, a spring connected to the loose gears and coiled about their supporting-shaft, and a means, substantially as described, for throwing either of the loose gears into engagement with its registering axle-gear, substantially as described.

3. In a car braking and starting mechanism, the combination, with gears fixed to the car-axle, of a shaft mounted in bearings carried by sliding bars, loose gears mounted upon said shaft and connected by a spring that is coiled about the shaft, ratchets fixed to the gears, pawls arranged in connection with the ratchets, a bracket mounted to be engaged by one of the pawls, bell-crank levers connected to the sliding bars, and operating-levers connected to the bell-crank levers, substantially as described.

ARIE V. DILLENBECK.

Witnesses:
JNO. R. FANNING,
CHAS. M. WILLIAMS.